United States Patent
Xu

(10) Patent No.: US 11,014,625 B2
(45) Date of Patent: May 25, 2021

(54) ARTICLE MADE BY COMPOSITE MATERIAL

(71) Applicant: FULL-TECH COMPOSITE MANUFACTURING COMPANY, Guangdong (CN)

(72) Inventor: Xiuzheng Xu, Taichung (TW)

(73) Assignee: FULL-TECH COMPOSITE MANUFACTURING COMPANY, Zhongshan (CN)

(*) Notice: Subject to any disclaimer, the term of this patent is extended or adjusted under 35 U.S.C. 154(b) by 55 days.

(21) Appl. No.: 16/340,538

(22) PCT Filed: Sep. 30, 2017

(86) PCT No.: PCT/CN2017/104741
§ 371 (c)(1),
(2) Date: Apr. 9, 2019

(87) PCT Pub. No.: WO2019/061394
PCT Pub. Date: Apr. 4, 2019

(65) Prior Publication Data
US 2019/0256166 A1    Aug. 22, 2019

(51) Int. Cl.
| | | |
|---|---|---|
| B62K 19/02 | (2006.01) |
| B60B 5/02 | (2006.01) |
| B32B 27/04 | (2006.01) |
| B60B 21/02 | (2006.01) |
| B32B 5/18 | (2006.01) |
| B32B 3/04 | (2006.01) |
| B32B 1/08 | (2006.01) |

(52) U.S. Cl.
CPC ............... B62K 19/02 (2013.01); B32B 1/08 (2013.01); B32B 3/04 (2013.01); B32B 5/18 (2013.01); B32B 27/04 (2013.01); B60B 5/02 (2013.01); B60B 21/02 (2013.01); *B32B 2262/106* (2013.01)

(58) Field of Classification Search
CPC .......... B62K 19/02; B32B 27/04; B32B 5/18; B60B 2360/36
See application file for complete search history.

(56) References Cited

U.S. PATENT DOCUMENTS

| | | | | |
|---|---|---|---|---|
| 4,758,605 A | * | 7/1988 | Williams | ........... C08G 18/1875 252/182.24 |
| 5,143,244 A | * | 9/1992 | Kauffman | ............ B65D 90/029 73/49.2 |
| 2014/0264970 A1 | * | 9/2014 | Bickerstaff | ............... E04H 5/12 261/108 |
| 2018/0361785 A1 | * | 12/2018 | Child | .................... B60B 21/104 |

FOREIGN PATENT DOCUMENTS

| | | |
|---|---|---|
| CN | 104512506 A | 4/2015 |
| CN | 1 05984542 A | 10/2016 |
| CN | 106696595 A | 5/2017 |
| TW | 200927522 A | 7/2009 |

* cited by examiner

*Primary Examiner* — Hai Vo
(74) *Attorney, Agent, or Firm* — Muncy, Geissler, Olds & Lowe, P.C.

(57) ABSTRACT

An article made by composite material includes a body made of reinforced fiber. The body has at least two opposing sidewalls. A foam component is embeddedly disposed in each sidewall. Owing to the two foam components, the finished composite structure is lightweight and has high mechanical strength.

5 Claims, 3 Drawing Sheets

ARTICLE MADE BY COMPOSITE MATERIAL

BACKGROUND OF THE INVENTION

1. Technical Field

The present disclosure relates to articles and, more particularly, to an article made by composite material which is lightweight and has high mechanical strength.

2. Description of Related Art

Bicycles nowadays are increasingly lightweight. Not only are frames made of composite materials which have low specific weight, high mechanical strength and high rigidity, but rims are sometimes also made of the composite materials, so as to minimize the weight of the bicycles. Finished structures formed from the composite materials are hollow. If the walls of the finished structures are overly thick, the finished structures will not be lightweight. If the walls of the finished structures are overly thin, the finished structures will rupture under an excessive torque. Therefore, it is imperative to provide a finished article made by composite materials such that the finished article is lightweight and has high mechanical strength.

BRIEF SUMMARY OF THE INVENTION

It is an objective of the present disclosure to provide a finished composite structure which is lightweight and has high mechanical strength.

In order to achieve the above and other objectives, the finished composite structure of the present disclosure comprises: a body made of reinforced fiber and having at least two opposing sidewalls; and a foam components embeddedly disposed in each said sidewall. Owing to the two foam components, the finished composite structure is lightweight and has high mechanical strength.

In an embodiment of the present disclosure, the body is a rim and further has an outer circumferential wall and an inner circumferential wall, with the outer circumferential wall connected between the two sidewalls and separated from top ends of the two sidewalls by a predetermined distance, and the inner circumferential wall connecting bottom ends of the two sidewalls. The thickness of top and bottom ends of the foam components is less than the thickness of central parts of the foam components.

In an embodiment of the present disclosure, the body is a tube of a bicycle frame and has four said paired, opposing sidewalls, namely two vertically opposing sidewalls and two opposing sidewalls, and the sidewalls each have therein at least one said foam component. Preferably, the sidewalls each have rib portions arranged in a discrete manner, and the foam components are each disposed between two adjacent said rib portions. Therefore, the foam components can support the sidewalls well.

DETAILED DESCRIPTION OF THE INVENTION

Figure 1:
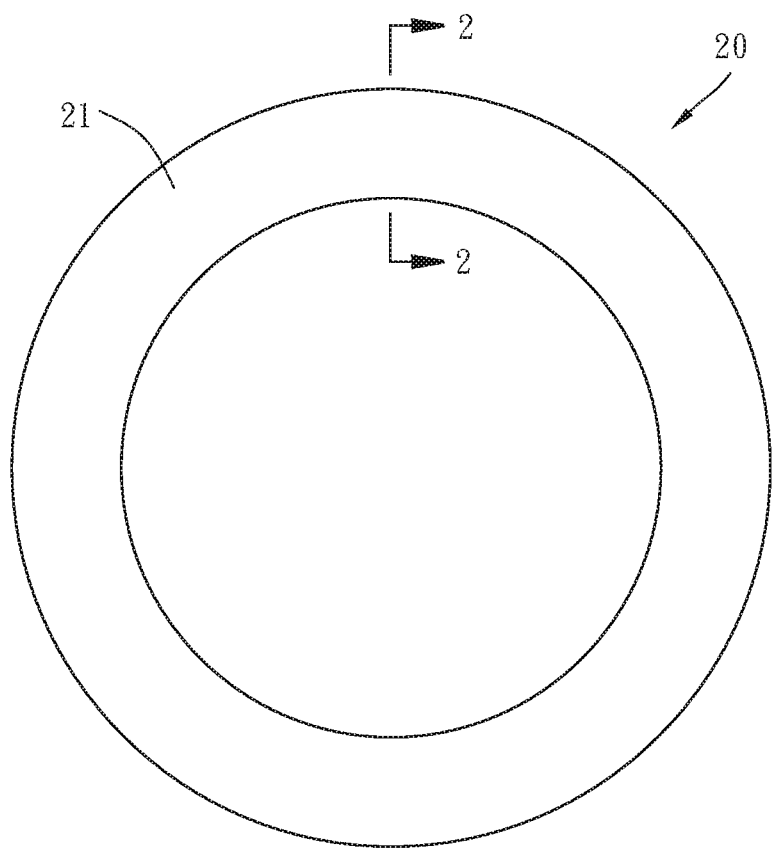
FIG. 1 is a plan view of a article structure according to the first embodiment of the present disclosure.
Figure 2:
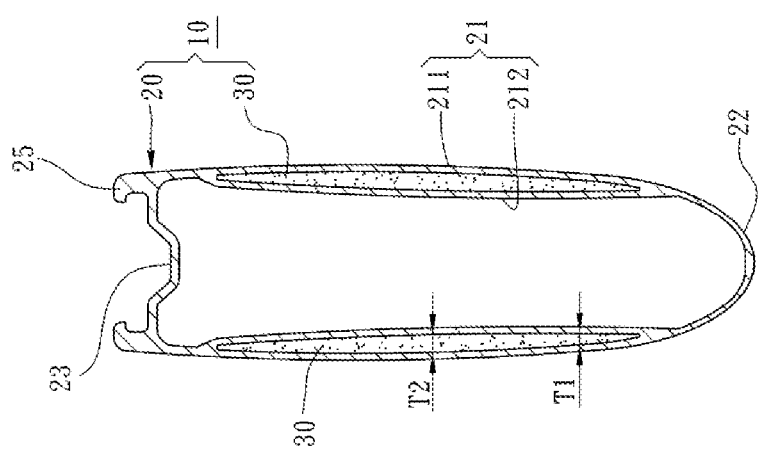
FIG. 2 is a cross-sectional view taken along line 2-2 of FIG. 1.

Referring to FIGS. 1, 2, an article made 10 by composite material according to the first embodiment of the present disclosure comprises a body 20 and two foam components 30.

Figure 4:
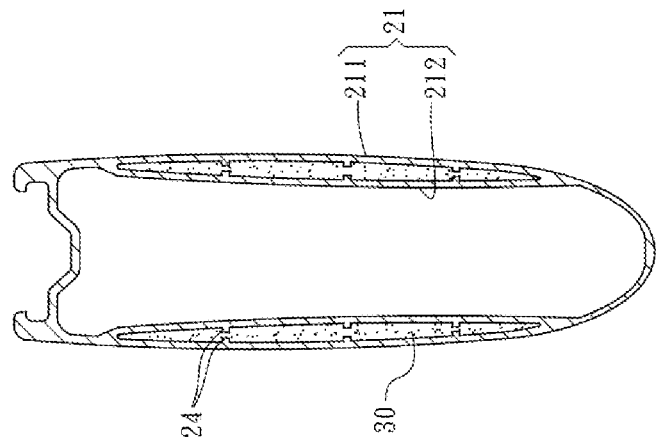
FIG. 4 is a cross-sectional view in the third embodiment of the present disclosure.
Figure 3:
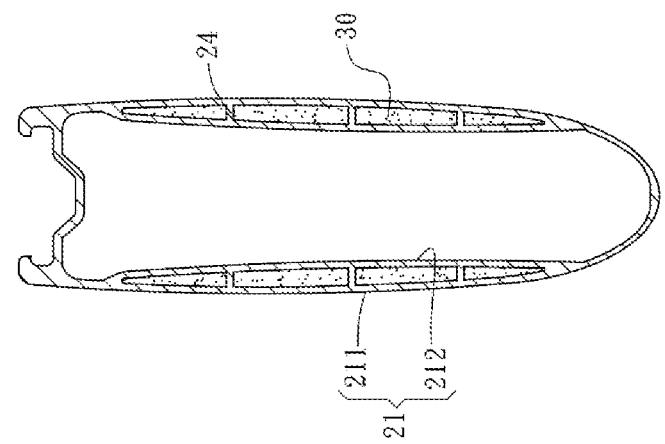
FIG. 3 is a cross-sectional view in the second embodiment of the present disclosure.

In this embodiment, the body 20 is a rim. During a manufacturing process, a reinforced fiber material, such as a carbon fiber, is adhered, layer by layer, to a die by additive manufacturing. After being dried, the reinforced fiber material is removed from the die. Upon completion of the manufacturing process, the body 20 comprises two opposing sidewalls 21, an inner circumferential wall 22 and an outer circumferential wall 23. The inner circumferential wall 22 connects bottom ends of the two sidewalls 21. The outer circumferential wall 23 is connected between the two sidewalls 21 and separates from top ends of the two sidewalls 21 by a predetermined distance. As shown in FIGS. 2-4, each of the sidewalls 21 includes an outer sidewall portion 211 and an inner sidewall portion 212. Each of the sidewalls 21 is connected to the outer circumferential wall 23 by an end of the outer sidewall portion 211. Each of the inner sidewall portions 212 is connected to an inner side of one of the outer sidewall portions 211 and spaced from the outer circumferential wall 23 at a predetermined distance. Each of the foam components is embeddedly disposed between the outer sidewall portion 211 and the inner sidewall portion 212 of one of the sidewalls 21. The outer sidewall portion 211, an inner sidewall portion 212, the inner circumferential wall 22, and the outer circumferential wall 23 collectively encompass a hollow portion without being filled with any fill material. The body 20 includes two lips 25, each of which is connected to one of two ends of the outer circumferential wall 23

The foam components 30 have a foaming density of 0.05~0.5 g/cm³, preferably 0.1~0.3 g/cm³. In this embodiment, the foam components 30 have a foaming density of 0.13 g/cm³. After part of the reinforced fiber material has been adhered to the die, the foam components 30 are placed on the reinforced fiber material, and then the remaining part of the reinforced fiber material is adhered to the die. After the body 20 has taken shape, the foam components 30 are enclosed by the sidewalls 21 of the body 20; hence, the foam components 30 are embeddedly disposed in the sidewalls 21 of the body 20, respectively, such that the foam components 30 can support and thereby reinforce the sidewalls 21 of the body 20. Furthermore, thickness T1 of the top and bottom ends of the foam components 30 is less than thickness T2 of central parts of the foam components 30.

Rib portions 24 are disposed in the sidewalls 21 of the body 20. The rib portions 24 come in two forms. Referring to FIG. 3, in the second embodiment of the present disclosure, the rib portions 24 are arranged in a discrete manner such that the foam components 30 are spaced apart by the rib portions 24. Referring to FIG. 4, in the third embodiment of the present disclosure, the rib portions 24 are arranged in a paired manner such that the foam components 30 enclose the rib portions 24. The rib portions 24, in whichever form, enhance the mechanical strength of the finished composite structure 10.

Figure 5:
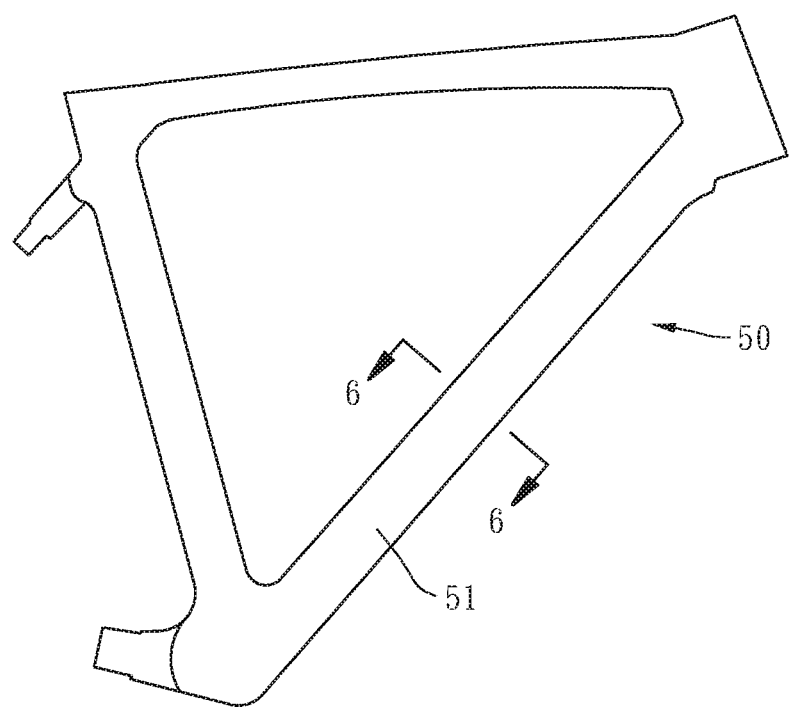
FIG. 5 is a plan view of an article structure according to the fourth embodiment of the present disclosure.
Figure 6:
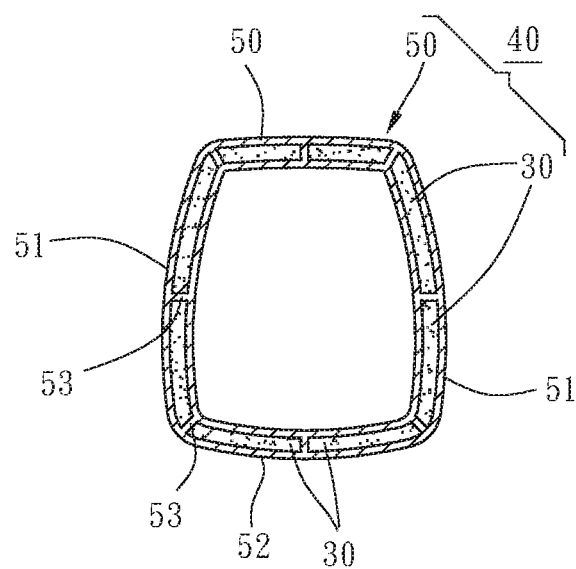
FIG. 6 is a cross-sectional view taken along line 6-6 of FIG. 5.

Referring to FIGS. 5, 6, an article 40 made by composite material and according to the fourth embodiment of the present disclosure comprises a body 50 and foam components 30.

In this embodiment, the body 50 is a tube of a bicycle frame. During a manufacturing process, a reinforced fiber material, such as a carbon fiber, is adhered, layer by layer, to a die by additive manufacturing. After being dried, the reinforced fiber material is removed from the die. Upon completion of the manufacturing process, the body 50 comprises four paired, opposing sidewalls 51, 52, namely two vertically opposing sidewalls 51 and two opposing sidewalls 52. The four sidewalls 51, 52 have therein spaced-apart rib portions 53. The rib portions 53 are each located at the central point of a corresponding one of the sidewalls 51, 52 and the junction of two adjacent sidewalls 51, 52.

Unlike their counterparts in the preceding embodiments, the foam components 30 in this embodiment are disposed between two adjacent rib portions 53 when hardened, and thus two foam components 30 are embeddedly disposed in each sidewall 51, 52.

In conclusion, according to the present disclosure, the article structure has at least two opposing foam components and a body made of reinforced fiber. Therefore, the finished composite structure is lightweight and has high mechanical strength.

What is claimed is:

1. An article made by composite material, comprising:
a body made of reinforced fiber and having at least two opposing sidewalls; and
two foam components embeddedly disposed in the sidewalls of the body, respectively,
wherein the body is a rim,
wherein the body further comprises an outer circumferential wall and an inner circumferential wall, with the outer circumferential wall connected between the two sidewalls and separated from top ends of the two sidewalls by a predetermined distance, and the inner circumferential wall connecting bottom ends of the two sidewalls,
wherein a thickness of top and bottom ends of the foam components is less than a thickness of central parts of the foam components,
wherein each of the sidewalls includes an outer sidewall portion and an inner sidewall portion;
wherein each of the sidewalls is connected to the outer circumferential wall by an end of the outer sidewall portion thereof;
wherein each of the inner sidewall portions is connected to an inner side of one of the outer sidewall portions and spaced from the outer circumferential wall at a predetermined distance;
wherein each of the foam components is embeddedly disposed between the outer sidewall portion and the inner sidewall portion of each of the sidewalls;
wherein the outer sidewall portion, an inner sidewall portion, the inner circumferential wall, and the outer circumferential wall collectively encompass a hollow portion without being filled with any fill material; and
wherein the body further comprises two lips, each of which is connected to one of two ends of the outer circumferential wall.

2. The article made by composite material of claim 1, wherein each said sidewall of the body has rib portions arranged in a discrete manner such that the foam components are spaced apart by the rib portions.

3. The article made by composite material of claim 1, wherein each said sidewall of the body has rib portions arranged in a paired, opposing manner such that the foam components enclose the rib portions.

4. The article made by composite material of claim 1, wherein the foam components have a foaming density of 0.05~0.5 g/cm$^3$.

5. The article made by composite material of claim 4, wherein the foam components have a foaming density of 0.1~0.3 g/cm$^3$.

* * * * *